US007945061B1

(12) United States Patent
Smith et al.

(10) Patent No.: US 7,945,061 B1
(45) Date of Patent: May 17, 2011

(54) SCALABLE ARCHITECTURE FOR SUBSPACE SIGNAL TRACKING

(75) Inventors: John M. Smith, Nashua, NH (US); Michael J. Kotrlik, Hooksett, NH (US); Edward C. Real, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1210 days.

(21) Appl. No.: 11/422,814

(22) Filed: Jun. 7, 2006

(51) Int. Cl.
*G09F 27/00* (2006.01)
*G06F 7/52* (2006.01)
(52) U.S. Cl. .......................... 381/124; 708/620
(58) Field of Classification Search .......... 381/66, 381/124; 702/189, 196, 190; 708/422–426, 708/620, 627
See application file for complete search history.

(56) References Cited

U.S. PATENT DOCUMENTS

| 7,068,221 | B2 * | 6/2006 | Xin | 342/432 |
| 7,133,048 | B2 * | 11/2006 | Brand | 345/582 |
| 7,327,800 | B2 * | 2/2008 | Oprea et al. | 375/267 |
| H2222 | H * | 8/2008 | Rangaswamy et al. | |
| 2009/0238426 | A1 * | 9/2009 | Fear et al. | 382/128 |

OTHER PUBLICATIONS

Real, Edward, et al., "Adaptive Threat Warning", IEEE, 2003, pp. 812-816.
Real, Edward, et al., Two Algorithms for Fast Approximate Subspace Tracking, Jul. 1999, IEEE Transactions on Signal Processing, vol. 47, No. 7., pp. 1936-1945.
Xu, Fan, et al., "Efficient Hardware Architectures for Eigenvector and Signal Subspace Estimation", IEEE Transactions on Circuits and Systems—I: Regular Papers, vol. 51, No. 3, pp. 517-525.

\* cited by examiner

*Primary Examiner* — Curtis Kuntz
*Assistant Examiner* — Hai Phan
(74) *Attorney, Agent, or Firm* — Vern Maine & Associates

(57) ABSTRACT

A real-time implementation of a subspace tracker is disclosed. Efficient architecture addresses the unique computational elements of the Fast Approximate Subspace Tracking (FAST) algorithm. Each of these computational elements can scale with the rank and size of the subspace. One embodiment of architecture described is implemented in digital hardware that performs variable rank subspace tracking using the FAST algorithm. In particular, the FAST algorithm is effectively implemented by a few processing elements, coupled with an efficient Singular Vector Decomposition (SVD), and the realization/availability of high density programmable logic devices. The architecture enables the ability to track the possibly changing dimension of the signal subspace.

20 Claims, 8 Drawing Sheets

SCALABLE ARCHITECTURE FOR SUBSPACE SIGNAL TRACKING

STATEMENT OF GOVERNMENT INTEREST

Portions of the present invention may have been made in conjunction with Government funding under contract number DMEA-90-99-D-0007-0045, and there may be certain rights to the United States Government.

FIELD OF THE INVENTION

The invention relates to signal processing, and more particularly, to a real-time implementation of a subspace tracker.

BACKGROUND OF THE INVENTION

Subspace estimation is coming to play an important role in a variety of modern signal processing applications. Various algorithms are proposed for efficiently tracking the principal singular values and the associated left (or right) singular vectors of successive data matrices formed from observations of a nonstationary signal in nonstationary noise. The ability to perform this tracking in real-time and with sufficient accuracy is required for many signal processing applications in technology areas such as communications, radar, sonar, and speech processing.

In some of these applications, the component of the data referred to as the "signal" may actually be nonstationary interference. The subspace of that interference signal may be tracked for the purpose of suppressing that particular interference, rather than enhancing the signal or estimating its parameters. An important attribute of these tracking algorithms is the ability to track the possibly changing dimension of the signal subspace.

Many subspace tracking algorithms are proposed in the literature, but each are associated with one or more problems. For example, the projection approximation subspace tracker (PAST) algorithm and its variant PASTd can be used for subspace tracking, and employ only basic arithmetic computations. However, PAST algorithms may not provide the desired level of accuracy. A rank-adaptive fast subspace tracking (FST) algorithm is also available. However, the FST algorithm does not estimate eigenvalues or singular values.

The fast approximate subspace tracking (FAST) algorithm and its variant FAST2 can be used for tracking singular values, singular vectors, and the dimension of a signal subspace through an overlapping sequence of data matrices. The speed and accuracy of the FAST algorithm appear to be superior or at least comparable to other algorithms such as the PAST and PASTd algorithms, FST algorithm, and the Prony-Lanczos (PL) algorithm. However, it is unclear how to implement an architecture that can address the unique computational elements of the FAST algorithm. Exacerbating this problem is that each of the computational elements should scale with the rank and size of the subspace.

Simply stated, there are no currently available solutions for real-time implementations of a subspace tracker. What is needed, therefore, is a real-time implementation of a subspace tracker.

SUMMARY OF THE INVENTION

One embodiment of the present invention provides a device for subspace tracking using the FAST algorithm. The device includes a Project Vector computational block for multiplying Signal Observations by Subspace Estimates and accumulating to produce Low-Rank Approximations (e.g., represented as a vector of length r for each of c Signal Observations). The device further includes a Residual Vector computational block for determining a degree of match between the Subspace Estimates and a current Signal Observation based on a corresponding Low-Rank Approximation. The device further includes an Outer Product computational block for computing a product of the Low-Rank Approximations matrix across the Signal Observations. The device further includes a Singular Vector Decomposition (SVD) computational block for reducing the product into a Current Subspace Estimate, and an Estimate Subspace computational block for updating each of the Subspace Estimates based upon the Current Subspace Estimate. In one such case, the Low-Rank Approximation for the current Signal Observation, along with the current Signal Observation itself is reduced by the Residual Vector computation block into an Error vector and an Energy value. Here, the error vector represents the degree of match between the Subspace Estimates and the current Signal Observation on a per-element basis. The Energy value can be, for example, the sum of squares of the current Error vector. The device may include one or more ping-pong storages for storing at least one of the Signal Observations, Subspace Estimates, Low-Rank Approximations, and Current Subspace Estimate. In another particular case, each of the computational blocks scales with rank and size of the subspace being tracked. In another particular case, the device maintains a set of Subspace Estimates for each of c by n Signal Observations that span a rank setting r, where r is an integer value that is user-selectable. In another particular case, the SVD computational block is sized to accommodate a largest rank of processing. The system functionality can be implemented, for example, in software (e.g., executable instructions encoded on one or more computer-readable mediums), hardware (e.g., programmable logic or one or more FPGAs or ASICs), firmware (e.g., one or more microcontrollers with I/O capability and embedded routines for carrying out the functionality described herein), or some combination thereof. Many suitable means for implementing embodiments of the present invention will be apparent in light of this disclosure.

Another embodiment of the present invention provides a method for subspace tracking using the FAST algorithm. The method includes multiplying Signal Observations by Subspace Estimates and accumulating to produce Low-Rank Approximations (e.g., represented as a vector of length r for each of c Signal Observations). The method continues with determining a degree of match between the Subspace Estimates and a current Signal Observation based on a corresponding Low-Rank Approximation. The method continues with computing a product of the Low-Rank Approximations matrix across the Signal Observations. The method continues with reducing the product into a Current Subspace Estimate, and updating each of the Subspace Estimates based upon the Current Subspace Estimate. In one such case, the Low-Rank Approximation for the current Signal Observation, along with the current Signal Observation itself is reduced by the Residual Vector computation block into an Error vector and an Energy value. Here, the error vector represents the degree of match between the Subspace Estimates and the current Signal Observation on a per-element basis. The Energy value can be, for example, the sum of squares of the current Error vector. The method may include maintaining a set of Subspace Estimates for each of c by n Signal Observations that span a rank setting r, where r is an integer value that is user-selectable. The method may include storing at least one of the Signal Observations, Subspace Estimates, Low-Rank Approximations, and Current Subspace Estimate in one or more ping-pong storages.

Another embodiment of the present invention provides a machine-readable medium (e.g., one or more compact disks, diskettes, servers, memory sticks, or hard drives) encoded with instructions, that when executed by one or more processors, cause the processor to carry out a process for subspace tracking using the FAST algorithm. This process can be, for example, similar to or a variation of the previously described method.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

A real-time implementation of a subspace tracker disclosed. Efficient architecture addresses the unique computational elements of the Fast Approximate Subspace Tracking (FAST) algorithm. Each of these computational elements can scale with the rank and size of the subspace.

One embodiment of architecture described herein is implemented in digital hardware that performs variable rank subspace tracking using the FAST algorithm. In particular, the FAST algorithm is effectively implemented by a few processing elements, coupled with an efficient Singular Vector Decomposition (SVD), and the realization/availability of high density programmable logic devices. This architecture is capable of tracking the principal singular values and the associated left (or right) singular vectors of successive data matrices formed from observations of a nonstationary signal in nonstationary noise. As previously explained, the ability to perform this tracking in real-time and with sufficient accuracy is required for many signal processing applications in technology areas such as communications, radar, sonar, and speech processing. The architecture enables the ability to track the possibly changing dimension of the signal subspace.

System Architecture

Figure 1:
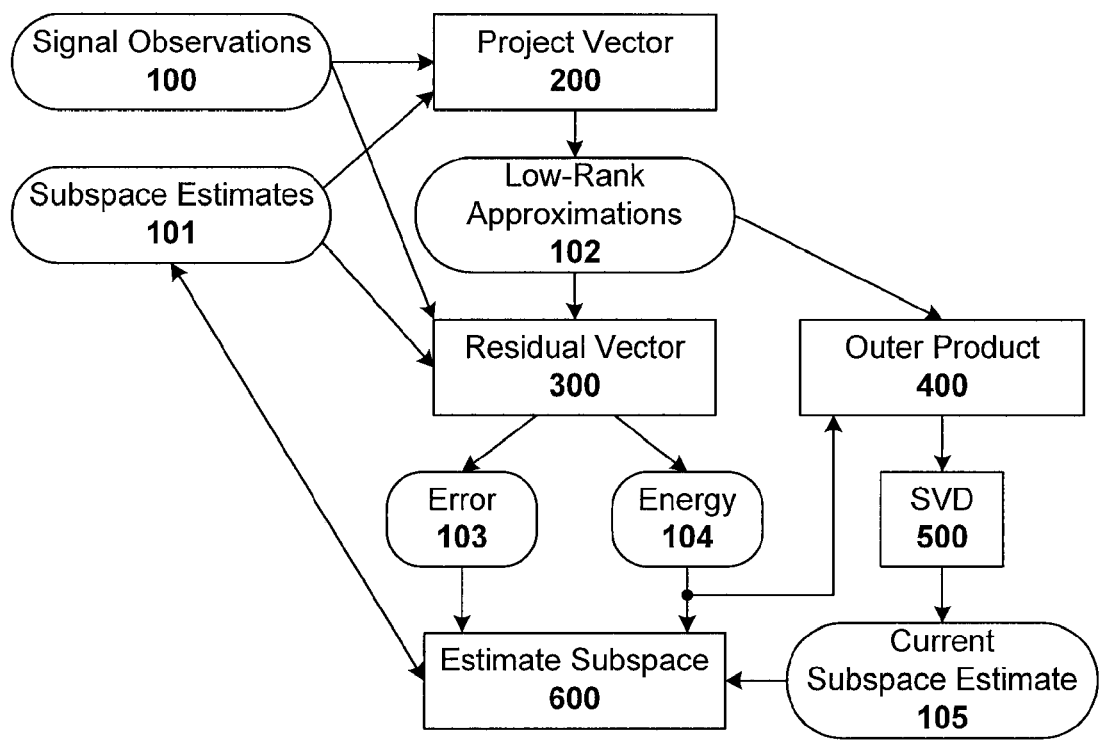
FIG. 1 is an overview block diagram of an architecture configured for subspace tracking using the FAST algorithm, in accordance with an embodiment of the present invention.

FIG. 1 is an overview block diagram of an architecture configured for subspace tracking using the FAST algorithm, in accordance with an embodiment of the present invention.

Square blocks represent computational operations, and include Project Vector 200, Residual Vector 300, Outer Product 400, Estimate Subspace 600, and Singular Vector Decomposition (SVD) 500. Rounded or oval blocks represent data that can span simple scalars to multidimensional matrices, and include Signal Observations 100, Subspace Estimates 101, Low-Rank Approximations 102, Error vector 103, Energy value 104, and Current Subspace Estimate 105.

Each of the computational blocks will be discussed separately in turn, with reference to FIGS. 2-8. For now, the overall process of the architecture will be described.

A set of Signal Observations 100 is collected and maintained (e.g., in a fast access memory, such as flash memory configured in a ping-pong storage scheme (two memory banks, where one bank can be read from while the other bank is being written to). A given observation will span time or space, represented as a column vector of n elements. In this particular example, there are a total of c observations in Signal Observations 100, representing a time history of observations whereby a new observation will replace the oldest observation.

The architecture also maintains a set of Subspace Estimates 101 for each of the c by n Signal Observations 100 which will additionally span the rank setting r. The Subspace Estimates 101 can be stored in memory like that which stores the Signal Observations 100. In one particular embodiment, rank is an integer value that is set by the user (e.g., via a pull-down menu or other suitable user interface mechanism). Generally speaking, the set of Subspace Estimates 101 has the highest amount of "hits" (i.e., sources and sinks) and should receive the most attention for bandwidth in any parallel scaling of the architecture.

As a new Signal Observation 100 is received, the current observation and all previous observations are reduced by the Project Vector 200 block using the current Subspace Estimates 101 to produce a Low-Rank Approximation 102, which is a vector of length r for each of the c observations. The Low-Rank Approximation 102 for the current Signal Observation 100, along with the observation itself is reduced by the Residual Vector 300 block into an Error vector 103 (a vector of length n), and an Energy value 104. The Error vector 103 represents the measure of how well the set of Subspace Estimates 101 models a given Signal Observation 100 on a per-element basis. In one particular embodiment, Energy value 104 is the sum of squares of the current Error vector 103.

The Low-Rank Approximation 102 of all Signal Observations 100, along with the Energy value 104 of the current observation is transformed by the Outer Product 400 block (which can be implemented using a simple outer product operation). The SVD 500, in turn, reduces this into a Current Subspace Estimate 105 (which is a vector of length c by r that is drawn from the r-most significant left singular vectors). The Current Subspace Estimate 105, is then applied by the Estimate Subspace 600 block (along with the Error vector 103, Energy value 104, and Subspace Estimates 101) to produce an updated Subspace Estimate 101.

The Low-Rank Approximations 102 and Current Subspace Estimate 105 can be stored in memory like that which stores the Signal Observations 100 and Subspace Estimates 101. Likewise, Energy value 104 and Error vector 103 can be stored, if so desired.

Figure 2:
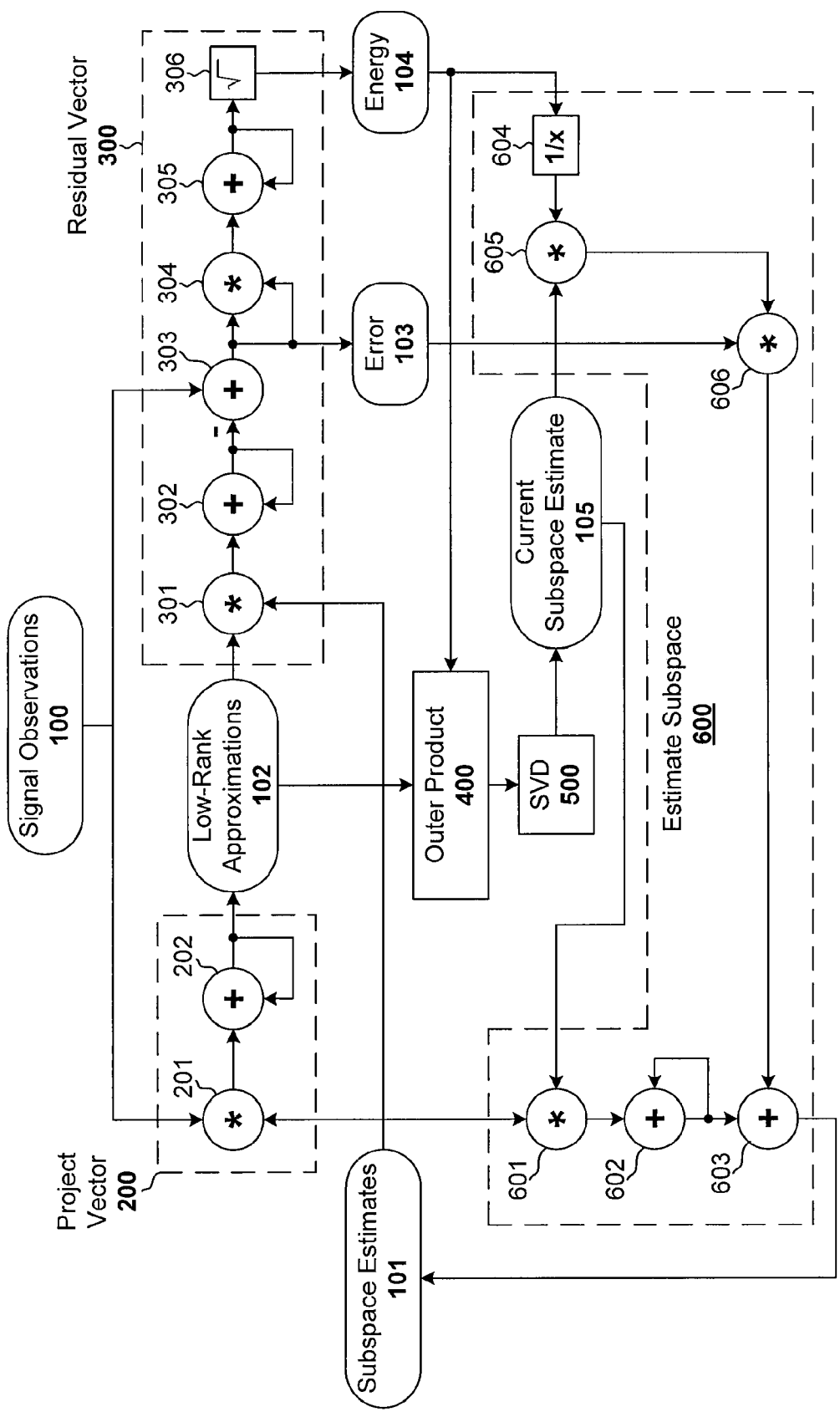
FIG. 2 is a detailed block diagram of the architecture shown in FIG. 1, in accordance with an embodiment of the present invention.

FIG. 2 is a more detailed block diagram of the architecture shown in FIG. 1, in accordance with an embodiment of the present invention. This example architecture is designed to provide a small footprint, and does not exploit the parallelism of matrix multiplications. Thus, it operates at a slower speed. However, architecture that does exploit such parallelism will be discussed in turn.

As can be seen, the Project Vector 200 of this example configuration includes a multiplier 201 and an accumulator 202 (which effectively operates as an adder). Embodiments of the Project Vector 200 are discussed in more detailed with reference to FIGS. 3 and 4. The Residual Vector 300 includes multipliers 301, 304, accumulators 302, 303, 305 (sometimes referred to as adders or substractors, depending on the designated operation), and a square root module 306. Embodiments of the Residual Vector 300 are discussed in more detailed with reference to FIGS. 5 and 6. The Estimate Subspace 600 includes multipliers 601, 605, 606, accumulators 602, 603, and an inverter 604. Embodiments of the Estimate Subspace 600 are discussed in more detailed with reference to FIGS. 7 and 8.

As previously explained, the Outer Product 400 block can be implemented using a simple outer product operation, or other suitable process for computing the product of the Low-Rank Approximations 102 matrix across all Signal Observations 100. The SVD 500 is configured for carrying out singular vector decomposition, and can be implemented, for example, as discussed in U.S. patent application Ser. No. 11/046,377, filed Jan. 28, 2005, and titled "Scalable 2×2 Rotation Processor For Singular Value Decomposition." This application is herein incorporated in its entirety by reference. Each of the Outer Product 400 and SVD 500, and there respective interaction with other computation modules and data, are discussed in further detail with reference to FIGS. 3-8.

In one particular embodiment, each of the computational blocks (which may include, for example, storage cells, adders/substractors, multipliers, square root modules, and inverters) is realized with programmable logic, such as a field programmable gate array (FPGA) or other such configurable processing environment. Alternatively, the computational blocks can be implemented in software (e.g., C, C++) executing on one or more processors. Alternatively, the computation blocks can be implemented with a combination of hardware and software (e.g., some programmable logic and some executable routines. Numerous such configurations will be apparent in light of this disclosure.

Project Vector

Figure 3:
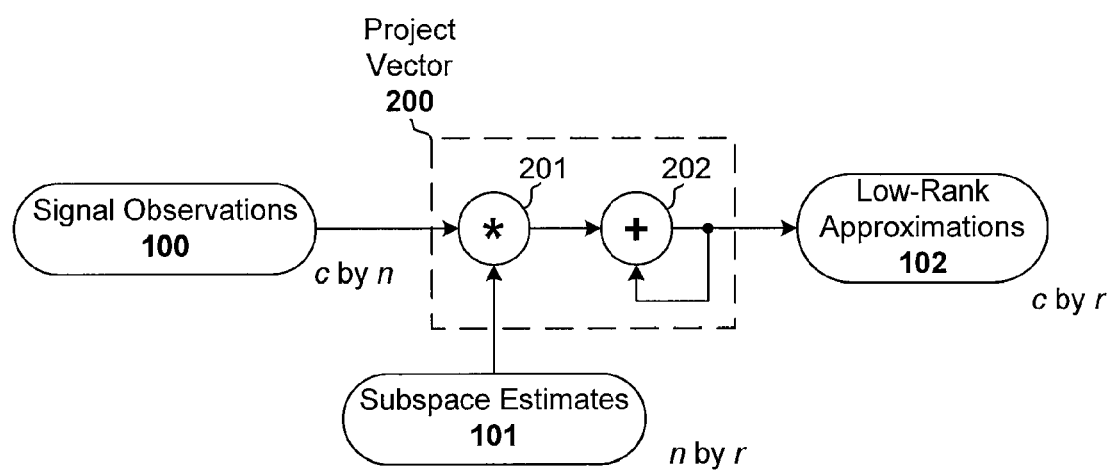
FIG. 3 illustrates the simplest realization of a Project Vector computational block shown in FIGS. 1 and 2, configured in accordance with an embodiment of the present invention.

FIG. 3 illustrates the simplest realization of a Project Vector 200 computational block shown in FIGS. 1 and 2, configured in accordance with an embodiment of the present invention.

Figure 4:
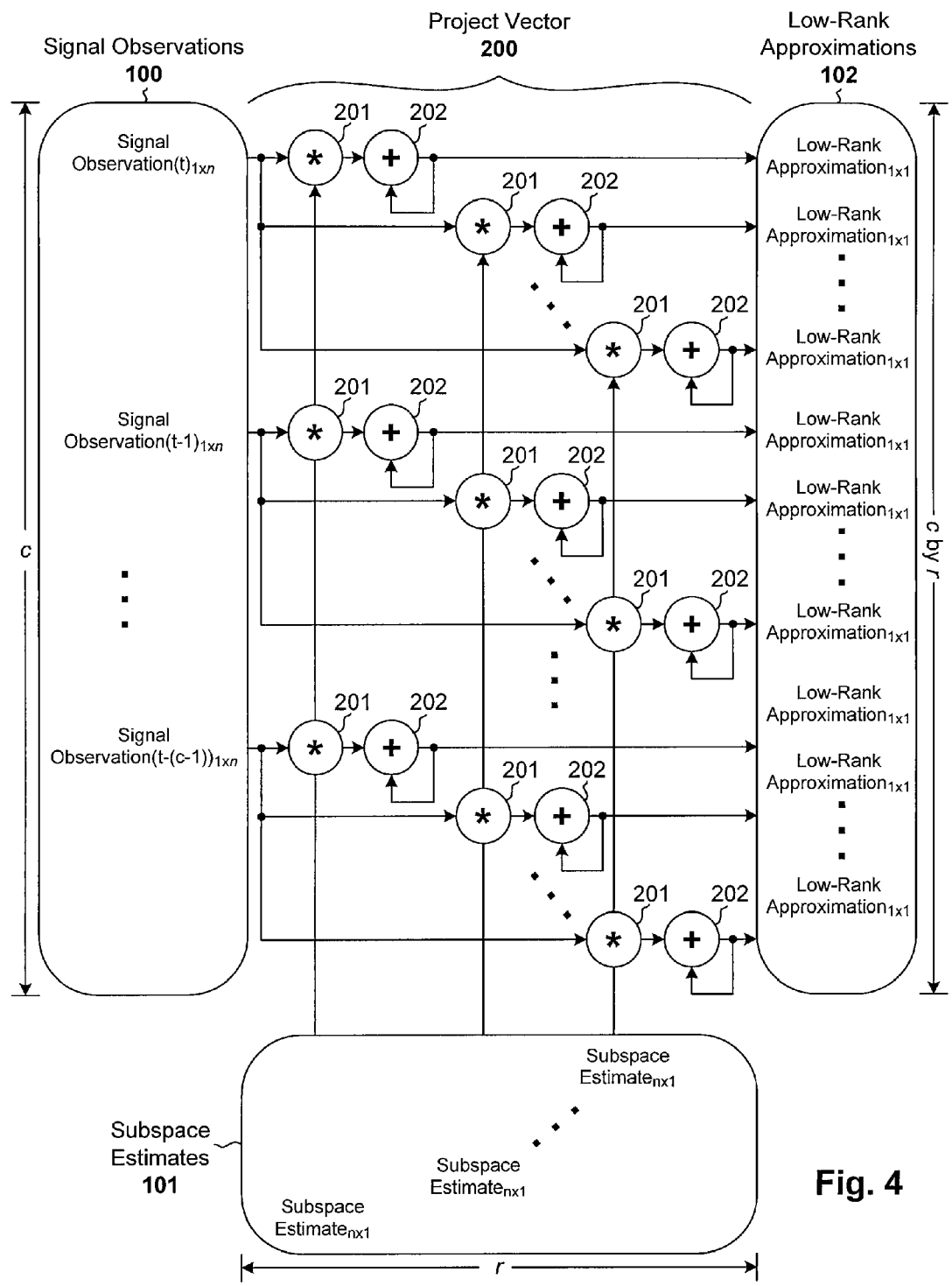
FIG. 4 illustrates a full-parallel realization of the Project Vector computational block shown in FIGS. 1 and 2, configured in accordance with an embodiment of the present invention.

As can be seen, the process of Project Vector 200 is a matrix multiply. In more detail, all Signal Observations 100 are multiplied by multiplier 201 against the Subspace Estimates 101 and then accumulated by accumulator 202 to produce the Low-Rank Approximations 102. If storage bandwidth allows, the matrix multiplies can be broken down, for example, into vector multiplies as illustrated in FIG. 4, or half-sized vector multiplies. The Project Vector 200 block can be implemented, for example, with finite precision operations.

As another mechanism for achieving real-time performance in an application, once a new set of Subspace Estimates 101 are calculated, the Project Vector 200 block can be re-exercised against all current Signal Observations 100 prior to the arrival of a new observation. A new Signal Observation 100 would also require the exercise of Project Vector 200, but there may be a window of time, prior to this event, in which to re-evaluate the Low-Rank Approximations 102 on the older Signal Observations 100, as will be appreciated in light of this disclosure.

FIG. 4 illustrates a full-parallel realization of the Project Vector 200 computational block shown in FIGS. 1 and 2, configured in accordance with an embodiment of the present invention.

As can be seen, each of the c Signal Observations 100 (e.g., Signal Observation $(t)_{1 \times n}$, Signal Observation $(t-1)_{1 \times n}$, ... Signal Observation $(t-(c-1))_{1 \times n}$) is provided in parallel to r multiplier 201 and accumulator 202 sets making up the parallel realization of the Project Vector 200. Note that this embodiment does not represent a systolic array, in that r Subspace Estimates 101 (e.g., Subspace Estimate$_{n \times 1}$, Subspace Estimate$_{n \times 1}$, ... Subspace Estimate$_{n \times 1}$) feed all of the multipliers 201 directly, and are not products. The data output by the Project Vector 200 makes up the Low-Rank Approximations 102, which as previously explained is a vector of length r for each of the c Signal Observations 100.

Residual Vector

Figure 5:
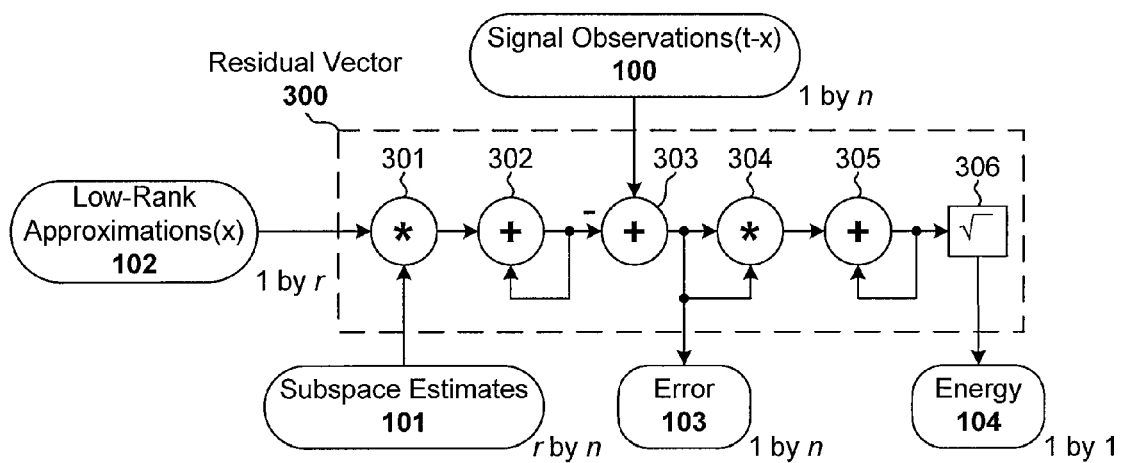
FIG. 5 illustrates the simplest realization of a Residual Vector computational block shown in FIGS. 1 and 2, configured in accordance with an embodiment of the present invention.

FIG. 5 illustrates the simplest realization of a Residual Vector 300 computational block shown in FIGS. 1 and 2, configured in accordance with an embodiment of the present invention.

The Residual Vector 300 computation block (e.g., x∈{0, . . . , c−1}) is used to determine the degree of match between the Subspace Estimates 101 and a single Signal Observation 100. For a given Signal Observation 100 at time t−x, its Low-Rank Approximation 102 is multiplied by multiplier 301 against the Subspace Estimates 101 and summed by adder 302 across rank. This stage of the Residual Vector 300 can be alternatively implemented with parallelism (as will be discussed with reference to the example embodiment shown in FIG. 6). The result of this accumulation by adder 302 is an estimate of the observation.

A difference by subtractor 303 against the Signal Observation 100 produces an Error 103 score for each sample in the observation. The Residual Vector 300 also determines the overall match with a scalar Energy 104 score by, in this particular embodiment, taking the square root 306 of the sum 305 of the Error 103 terms squared 304. Further parallelism can be achieved with the scoring of the Signal Observations 100, but in practice, this process is only exercised for two observations. As will be appreciated in light of this disclosure, the Residual Vector 300 can be implemented using finite precision processing elements.

Figure 6:
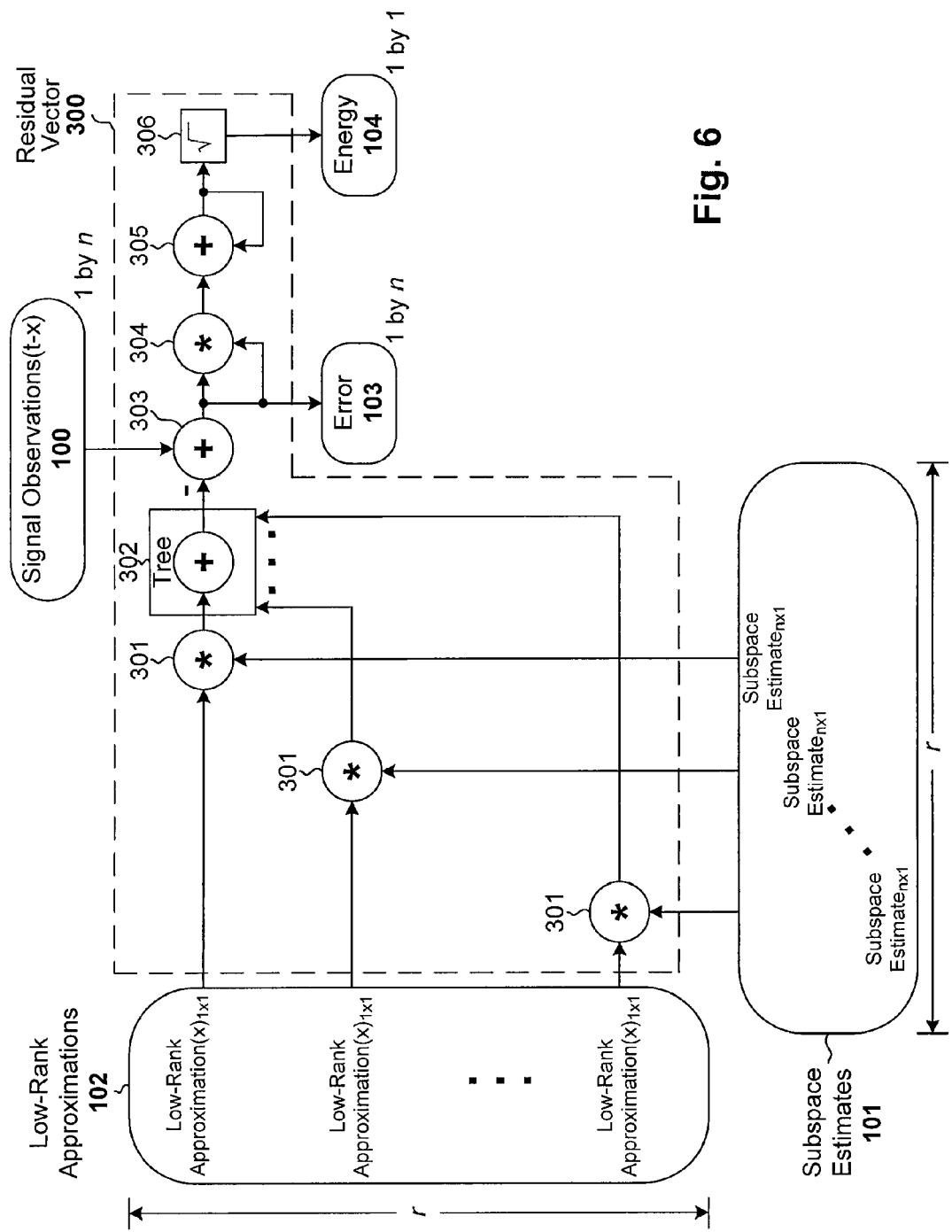
FIG. 6 illustrates a full-parallel realization of the Residual Vector computational block shown in FIGS. 1 and 2, configured in accordance with an embodiment of the present invention.

FIG. 6 illustrates a full-parallel realization of the Residual Vector 300 computational block shown in FIGS. 1 and 2, configured in accordance with an embodiment of the present invention.

Here, for a given Signal Observation 100 at time t−x, each of its r Low-Rank Approximations 102 is multiplied by a corresponding multiplier 301 against the corresponding Subspace Estimates 101 (e.g., Subspace Estimate$_{n \times 1}$, Subspace Estimate$_{n \times 1}$, . . . . Subspace Estimate$_{n \times 1}$) and summed by adder 302 across rank. In this parallel embodiment, note that adder 302 is implemented as an adder tree to receive all r inputs. The result of this accumulation by adder 302 is an estimate of the observation. The remainder of the full-parallel realization of the Residual Vector 300 operates as discussed with reference to FIG. 5.

Outer Product

The Outer Product 400 operation is a relatively straight forward process. Its usage here is to take the outer product of the Low-Rank Approximations 102 (e.g., populated with a row of zeros ending with the Energy 104 value from the Residual Vector 300 computational block) matrix across all observations. Generally, the size of the resulting matrix will be small. The result of the outer product 400 computation is used as the matrix to be decomposed by the SVD 500. In one particular embodiment, each of the Outer Product 400 and the SVD 500 are implemented with a minimum, single precision floating point accuracy.

Singular Vector Decomposition (SVD)

As previously explained, the SVD 500 reduces the matrix produced by the Outer Product 400 into a Current Subspace Estimate 105. In more detail, the SVD 500 produces a set of eigenvalues (1 by r) as well as a set of left and right eigenvectors (r by r). The eigenvalues need to be ordered from high to low with the left and right eigenvectors sorted accordingly. Since the SVD 500 is performed on the output of the Outer Product 400, the left and right eigenvectors are identical. Therefore, the complexity of the SVD 500 operation can be reduced. The Current Subspace Estimate 105 is the resultant eigenvectors. The Current Subspace Estimate 105 is then applied by the Estimate Subspace 600 block (along with the Error vector 103, Energy value 104, and Subspace Estimates 101) to produce an updated Subspace Estimate 101.

In one particular embodiment, the SVD 500 is sized to accommodate the largest rank of processing, r. Should r be chosen less than the maximum allotted for, the SVD 500 is sufficient but the Low-Rank Approximation 102 would need to contain zeros in the unused indices. Further detailed embodiments of the SVD 500 are discussed in he previously incorporated U.S. patent application Ser. No. 11/046,377. In one such particular embodiment, a two-plane rotation (TPR) approach to Gaussian elimination (Jacobi) is used for computational efficiency in determining rotation parameters. A rotation processor is constructed using the TPR approach to perform SVD on two by two matrices yielding both eigenvalues and left and right eigenvectors. The rotation processor can then be replicated and interconnected to achieve higher dimensioned matrices. For higher dimensional matrices, the rotation processors on the diagonal solve the 2×2 rotation angles, broadcast the results to off-diagonal processors, whereby all processors perform matrix rotations in parallel. FIGS. 3-5 of U.S. patent application Ser. No. 11/046,377 illustrate an array of 2×2 rotation processors configured for handling decomposition of the matrix generated by the Outer Product 400, in accordance with one embodiment of the present invention.

Estimate Subspace

Figure 7:
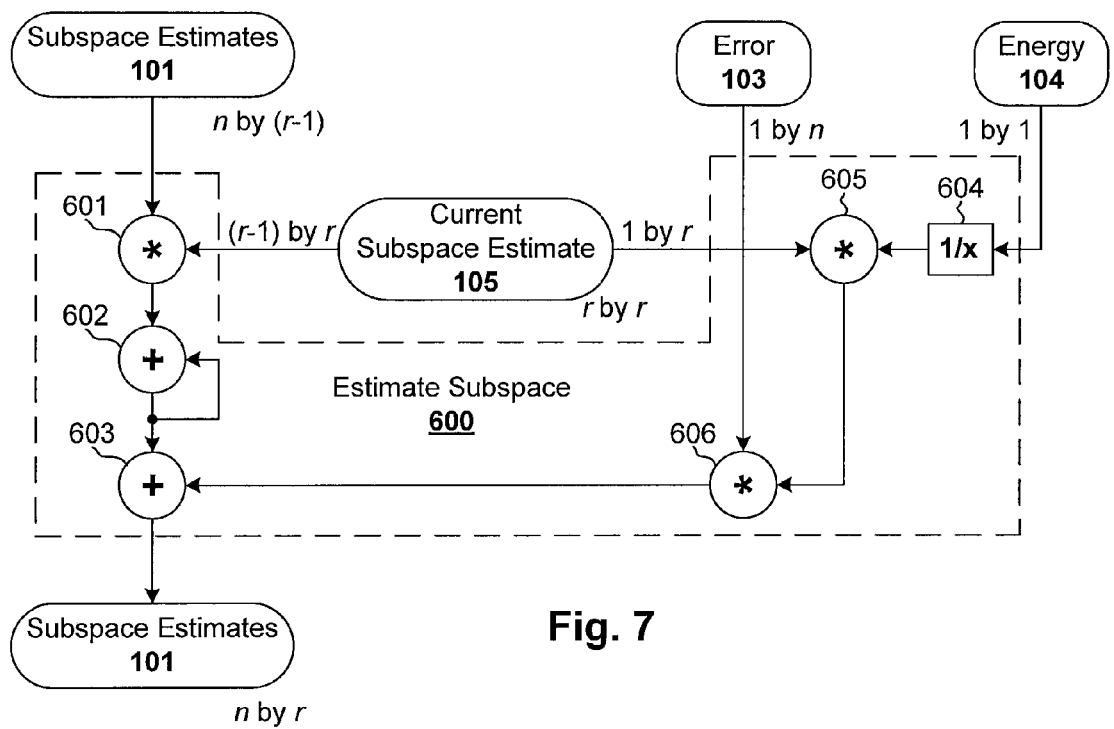
FIG. 7 illustrates the simplest realization of a Estimate Subspace computational block shown in FIGS. 1 and 2, configured in accordance with an embodiment of the present invention.

FIG. 7 illustrates the simplest realization of a Estimate Subspace 600 computational block shown in FIGS. 1 and 2, configured in accordance with an embodiment of the present invention.

In general, performing the Estimate Subspace 600 block is the most time consuming process. Any degree of parallelism will therefore provide advantage. Also, a ping-pong memory (or other suitable fast access memory) for the storage of the Subspace Estimate 101 will also provide desirable benefits, particularly for large values of n. In accordance with one embodiment of the present invention, the purpose of the Estimate Subspace 600 computational block is to correct or otherwise update the Subspace Estimate 101 (n by r) based upon the Current Subspace Estimate 105 (r by r) as well as the recently measured Error 103 (1 by n). A relatively simple means of performing the update is illustrated in example architecture of FIG. 7.

As can be seen, the Current Subspace Estimate 105 (1 by r), which correlates with the most significant eigenvalue from the SVD 500 computational block, is normalized 604 and 605 by the Energy 104 (1 by 1), and then multiplied 606 against the Error 103 (1 by n). This value is accumulated 603 with the accumulated 602 product 601 of the previous Subspace Estimates 101 (n by (r−1)) and the Current Subspace Estimate 105 ((r−1) by r). For precision, and in one particular embodiment, the inversion 604 of the Energy 104 and multiplication 605 and 606 are implemented with floating point precision, and the remainder of the Estimate Subspace 600 processing block is implemented using fixed-point precision.

Figure 8:
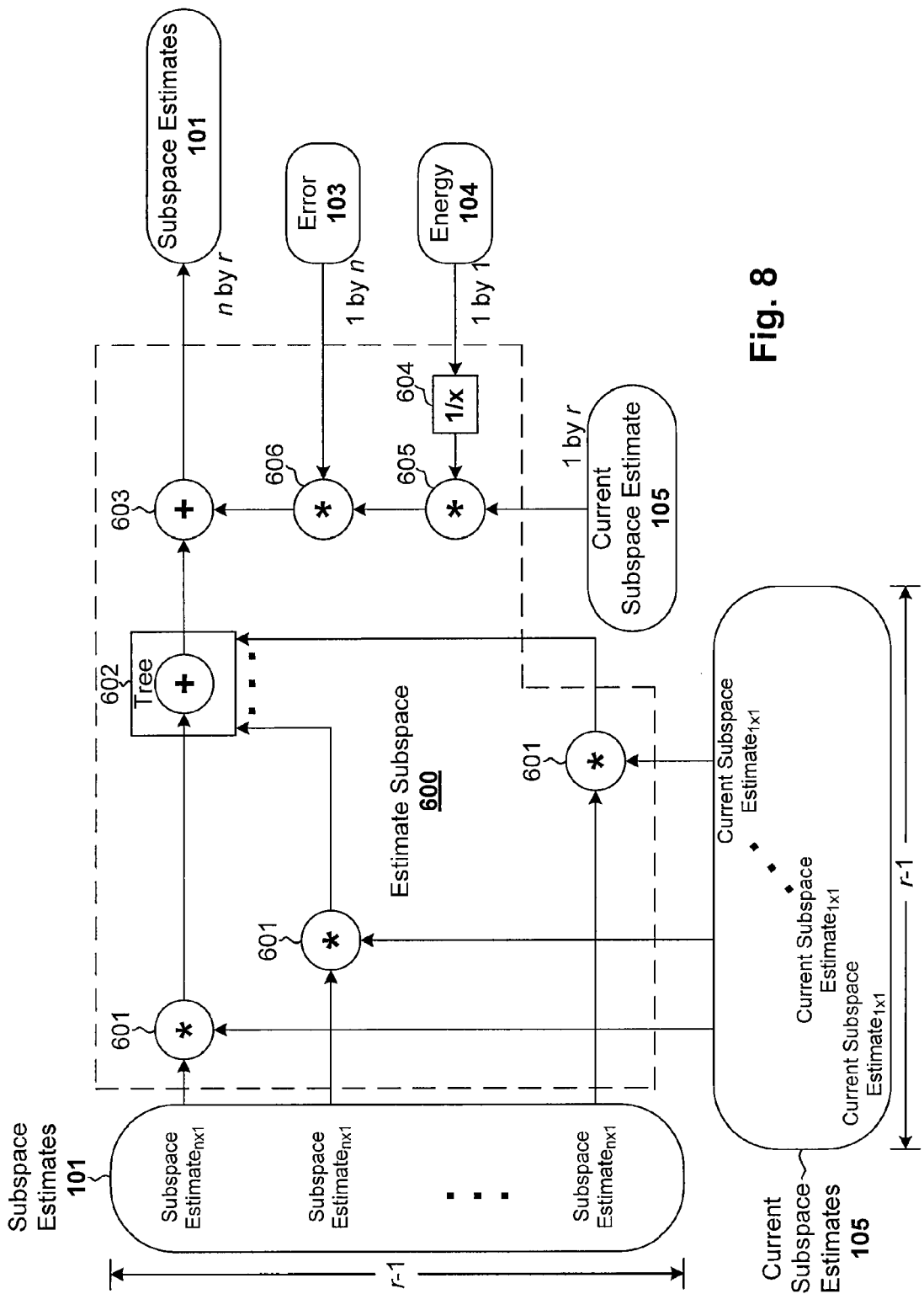
FIG. 8 illustrates a parallel realization of the Estimate Subspace computational block shown in FIGS. 1 and 2, configured in accordance with an embodiment of the present invention.

A higher performance Estimate Subspace 600 architecture is illustrated in FIG. 8. In particular, FIG. 8 illustrates a parallel realization of the Estimate Subspace 600 computational block shown in FIGS. 1 and 2, configured in accordance with an embodiment of the present invention Note here that the fullest degree of parallelism would instantiate the architecture of FIG. 8, r times. Also, note that the product 605 of the Current Subspace Estimate 105 and the inverted 604 Energy 104 term is only computed once allowing for scheduling the Error 103 multiplier for re-use to reduce size of the architecture.

Here, each of the previous (r−1) Subspace Estimates 101 (n by 1) is multiplied by a corresponding multiplier 601 against the corresponding Current Subspace Estimates 105 (e.g., Current Subspace Estimate$_{1\times1}$, Current Subspace Estimate$_{1\times1}$, ... Current Subspace Estimate$_{1\times1}$) and summed by accumulated by accumulator 602. In this parallel embodiment, note that adder 602 is implemented as an adder tree to receive all r−1 inputs. The accumulated 602 product 601 of the previous Subspace Estimates 101 and the Current Subspace Estimate 105 is accumulated 603 with the value resulting from the process previously described with reference to FIG. 7 (where the Error 103 is normalized 604 and 605 by the Energy 104 and multiplied 606 against the Current Subspace Estimate 105 that correlates with the most significant eigenvalue from the SVD 500 computational block). The remainder of this example Estimate Subspace 600 operates as discussed with reference to FIG. 7.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A hardware implemented subspace tracking apparatus using Fast Approximate Subspace Tracking (FAST) for signal observations, comprising:
    a Project Vector unit configured to multiply the signal Observations by Subspace Estimates and accumulate to produce Low-Rank Approximations;
    a Residual Vector unit configured to determine a degree of match between the Subspace Estimates and a current Signal Observation based on a corresponding Low-Rank Approximation;
    an Outer Product unit configured to compute a product of the Low-Rank Approximations matrix across the Signal Observations;

a Singular Vector Decomposition (SVD) unit configured to reduce the product of the Low-Rank Approximations matrix into a Current Subspace Estimate; and an Estimate Subspace unit configured to update each of the Subspace Estimates based upon the Current Subspace Estimate.

2. The subspace tracking apparatus of claim 1 wherein the Low-Rank Approximations are represented as a vector of length r for each of c Signal Observations, wherein c is a count of a number of signal observations.

3. The subspace tracking apparatus of claim 1 wherein the Low-Rank Approximation for the current Signal Observation, along with the current Signal Observation itself is reduced by the Residual Vector unit into an Error vector and an Energy value, the error vector representing the degree of match between the Subspace Estimates and the current Signal Observation on a per-element basis.

4. The subspace tracking apparatus of claim 3 wherein the Energy value is the sum of squares of the current Error vector.

5. The subspace tracking apparatus of claim 1 further comprising one or more ping-pong storages for storing at least one of the Signal Observations, Subspace Estimates, Low-Rank Approximations, and Current Subspace Estimate.

6. The subspace tracking apparatus of claim 1 wherein each of the units scales with rank and size of the subspace being tracked.

7. The subspace tracking apparatus of claim 1 wherein the apparatus maintains a set of Subspace Estimates for each of c by n Signal Observations which span a rank setting r, where r is an integer value that is user-selectable wherein c is a count of a number of Signal Observations and n is a number of elements of a column vector.

8. The subspace tracking apparatus of claim 1 wherein the SVD unit is sized to accommodate a largest rank of processing.

9. A non-transitory computer-readable medium that stores therein a computer program for realizing an encoding method in which Signal Observations are tracked using Fast Approximate Subspace Tracking (FAST), providing the possibly changing dimension of signal subspace, the computer program making a computer execute:

multiplying Signal Observations by Subspace Estimates and accumulating to produce Low-Rank Approximations;

determining a degree of match between the Subspace Estimates and a current Signal Observation based on a corresponding Low-Rank Approximation;

computing a product of the Low-Rank Approximations matrix across the Signal Observations;

reducing the product of the Low-Rank Approximations matrix into a Current Subspace Estimate; and updating each of the Subspace Estimates based upon the Current Subspace Estimate.

10. The computer-readable medium of claim 9 wherein the Low-Rank Approximations are represented as a vector of length r for each of c Signal Observations, wherein c is a count of a number of Signal Observations.

11. The computer-readable medium of claim 9 wherein the Low-Rank Approximation for the current Signal Observation, along with the current Signal Observation itself is reduced by the step of determining a degree of match into an Error vector and an Energy value, the error vector representing the degree of match between the Subspace Estimates and the current Signal Observation on a per-element basis.

12. The computer-readable medium of claim 11 wherein the Energy value is the sum of squares of the current Error vector.

13. The computer-readable medium of claim 9 wherein the method further comprises maintaining a set of Subspace Estimates for each of c by n Signal Observations which span a rank setting r, where r is an integer value that is user-selectable, and wherein c is a count of a number of Signal Observations and n is a number of elements of a column vector.

14. The computer-readable medium of claim 9 wherein the method further comprises storing at least one of the Signal Observations, Subspace Estimates, Low-Rank Approximations, and Current Subspace Estimate in one or more ping-pong storages.

15. A hardware implemented method for subspace tracking using Fast Approximate Subspace Tracking (FAST), comprising:

multiplying Signal Observations by Subspace Estimates and accumulating to produce Low-Rank Approximations by a hardware implemented project vector unit;

determining a degree of match between the Subspace Estimates and a current Signal Observation based on a corresponding Low-Rank Approximation by a hardware implemented residual vector unit;

computing a product of the Low-Rank Approximations matrix across the Signal Observations by a hardware implemented outer product unit;

reducing the product of the Low-Rank Approximations matrix into a Current Subspace Estimate by a hardware implemented Singular Vector Decomposition (SVD) unit; and updating each of the Subspace Estimates based upon the Current Subspace Estimate by a hardware implemented estimate subspace unit.

16. The method of claim 15 wherein the Low-Rank Approximations are represented as a vector of length r for each of c Signal Observations, wherein c is a count of a number of Signal Observations.

17. The method of claim 15 wherein the Low-Rank Approximation for the current Signal Observation, along with the current Signal Observation itself is reduced by the step of determining a degree of match into an Error vector and an Energy value, the error vector representing the degree of match between the Subspace Estimates and the current Signal Observation on a per-element basis.

18. The method of claim 17 wherein the Energy value is the sum of squares of the current Error vector.

19. The method of claim 15 further comprising maintaining a set of Subspace Estimates for each of c by n Signal Observations which span a rank setting r, where r is an integer value that is user-selectable, and wherein c is a count of a number of Signal Observations and n is a number of elements of a column vector.

20. The method of claim 15 further comprising storing at least one of the Signal Observations, Subspace Estimates, Low-Rank Approximations, and Current Subspace Estimate in one or more ping-pong storages.

* * * * *